(12) United States Patent
Sato et al.

(10) Patent No.: US 7,549,522 B2
(45) Date of Patent: Jun. 23, 2009

(54) CONTROL DEVICE FOR INPUT CLUTCH OF WORK VEHICLE

(75) Inventors: Yoshiharu Sato, Mooka (JP); Kentarou Itoh, Mooka (JP); Takahide Takiguchi, Mooka (JP)

(73) Assignee: Komatsu Ltd., Tokyo (JP)

( * ) Notice: Subject to any disclaimer, the term of this patent is extended or adjusted under 35 U.S.C. 154(b) by 362 days.

(21) Appl. No.: 10/579,387

(22) PCT Filed: Sep. 13, 2005

(86) PCT No.: PCT/JP2005/016839

§ 371 (c)(1),
(2), (4) Date: May 15, 2006

(87) PCT Pub. No.: WO2006/030783

PCT Pub. Date: Mar. 23, 2006

(65) Prior Publication Data

US 2007/0125614 A1    Jun. 7, 2007

(30) Foreign Application Priority Data

Sep. 15, 2004    (JP) .............................. 2004-267703

(51) Int. Cl.
*B60W 10/02*    (2006.01)
*B60W 10/18*    (2006.01)

(52) U.S. Cl. ...................... 192/13 R; 192/15; 192/12 C

(58) Field of Classification Search .................. None
See application file for complete search history.

(56) References Cited

U.S. PATENT DOCUMENTS 3,614,998 A    10/1971    Houtz
3,853,210 A  *  12/1974    Kitano et al. .............. 192/221

(Continued)

FOREIGN PATENT DOCUMENTS

DE    1 780 281    5/1971

(Continued)

OTHER PUBLICATIONS

Swedish Office Action (in English language) issued Aug. 17, 2007.
Japanese Refusing Reason Notice (in English language) issued Oct. 2, 2008 in Japanese application No. 2006-535148.

*Primary Examiner*—Richard M. Lorence
(74) *Attorney, Agent, or Firm*—Wenderoth, Lind & Ponack, L.L.P.

(57) ABSTRACT

A device which can easily adjust a relationship between a clutch pressure of an input clutch and a braking force (brake pressure) generated by a brake device to a desired relationship by a simple structure, in which a draining oil passage which is branched from an oil passage for supplying a pressure oil to the input clutch is provided, and the draining oil passage is communicated with a tank. The draining oil passage is provided with a pressure reducing valve which increases the pressure oil flowing through the draining oil passage depending on the valve position to decrease a clutch pressure of the input clutch. A brake operating member is mechanically coupled with a valve operating member of the pressure reducing valve, and the valve operating member of the pressure reducing valve is mechanically coupled with a valve operating member of the brake control valve by, for example, a spring.

2 Claims, 3 Drawing Sheets

U.S. PATENT DOCUMENTS

| | | | |
|---|---|---|---|
| 4,222,469 A | * | 9/1980 | Kubolis et al. ............... 192/221 |
| 4,441,596 A | | 4/1984 | Nakahara et al. |
| 4,592,455 A | * | 6/1986 | Bubak ...................... 192/13 R |

FOREIGN PATENT DOCUMENTS

| | | |
|---|---|---|
| JP | 62-138116 | 6/1987 |
| JP | 63-61342 | 4/1988 |
| JP | 64-28328 | 2/1989 |
| JP | 1-186440 | 7/1989 |
| JP | 3-248929 | 11/1991 |
| JP | 3-118123 | 12/1991 |
| JP | 10-291432 A | 11/1998 |
| JP | 2000-142143 A | 5/2000 |

* cited by examiner

CONTROL DEVICE FOR INPUT CLUTCH OF WORK VEHICLE

TECHNICAL FIELD

The present invention relates to a work vehicle in which a driving force of an engine is transmitted to driving wheels through a traveling power train and also transmitted to a hydraulic pump for a work machine, and more particularly to a control device for an input clutch (modulation clutch) to be applied to a work vehicle which has an input clutch disposed between an engine and a transmission on a power transmission path of a traveling power train.

BACKGROUND ART

A driving force of the engine of a wheel loader is distributed to dual power transmission paths for traveling and working. In other words, the driving force of the engine is supplied to a traveling power train and a hydraulic pump for a work machine through a PTO shaft and distributed to traveling horsepower and working horsepower.

An input clutch (modulation clutch) is disposed between the engine and the transmission on the power transmission path of the traveling power train.

The input clutch is disposed to adjust the power transmitted to the traveling power train and to increase the power transmitted to a work machine via the hydraulic pump for the work machine or to prevent the vehicle from slipping depending on work conditions.

In a case where a wheel loader performs an excavation work by digging into the ground, it is necessary to decelerate the vehicle while depressing an accelerator pedal to keep the engine at a high rotation speed. Therefore, a brake pedal is depressed to decelerate the vehicle by operating the brakes, and also the clutch pressure of an input clutch is decreased to enhance a braking effect and to decrease the engine driving force transmitted to the traveling power train, thereby distributing a larger driving force to the hydraulic pump for the work machine.

Japanese Patent Application Laid-Open No. H01-186440 discloses an invention which is related to a general vehicle and aims to prevent engine stall at the time of braking by disengaging the clutch by supplying a brake operating oil to a cylinder for operating the clutch through piping when the brake pedal is depressed.

Japanese Patent Application Laid-Open No. H03-248929 discloses an invention which is related to a forklift, and aims to perform an inching operation by means of the brake pedal by operating a master cylinder for the brake pedal through a piston rod when the brake pedal is depressed and by pushing or pulling a cable in association with the operation of the brake pedal to operate an inching control valve.

To control both of the brake device and the input clutch depending on a depressed amount of the brake pedal, it is necessary to adjust a relationship between a clutch pressure of an input clutch and a braking force (brake pressure) generated by the brake device to a desired relationship as shown in, for example, FIG. 3. It is desired that the adjustment can be made easily by a simple structure.

But, according to the invention described in JP H01-186440, it is configured to control the clutch pressure of the input clutch by the brake operating oil. Therefore, the relationship between the brake's braking force and the clutch pressure is determined uniquely depending on the designs of hydraulic oil pipe and hydraulic equipment, and the relationship cannot be changed easily. The clutch pressure is varied by an influence of a temperature of the brake operating oil or the like, and stable characteristics cannot be obtained.

Further, JP H01-186440 is directed to a general automobile and is essentially different from the present invention, which is directed to a work vehicle such as a wheel loader in that an engine driving force is distributed to dual power transmission paths for traveling and working.

The invention described in JP H03-248929 is directed to the control of an inching clutch, which is disposed within the transmission and is essentially different from the present invention which controls the input clutch disposed between the engine and the transmission.

The invention described in JP H03-248929 is configured to independently operate the braking master cylinder and the inching control valve, so that the structure becomes complex and the adjustment cannot be made easily.

The present invention has been made in view of the above circumstances and has an object to overcome the above problems by facilitating the adjustment of the relationship between the clutch pressure of the input clutch and the braking force (brake pressure) generated by the brake device to a desired relationship by a simple structure.

SUMMARY OF THE INVENTION

A first aspect of the invention is a control device for an input clutch of a work vehicle, which is applied to a work vehicle in that a driving force of an engine is transmitted to drive wheels through a traveling power train and also transmitted to a hydraulic pump for a work machine, comprising:

an input clutch which is disposed in a power transmission path of a traveling power train of the engine and between the engine and a transmission;

a brake means for decelerating the work vehicle;

a brake control valve which operates to increase the braking force of the brake means depending on a valve position;

a brake operation means which is disposed to operate the brake control valve;

a draining oil passage which is an oil passage branched from an oil passage for supplying a pressure oil to the input clutch and communicated with a tank; and a pressure reducing valve which is disposed in the draining oil passage and operates to increase the pressure oil flowing through the draining oil passage according to a valve position and to decrease a clutch pressure of the input clutch, wherein:

the brake operation means is mechanically coupled with a valve operating member of the pressure reducing valve, and the valve operating member of the pressure reducing valve is mechanically coupled with a valve operating member of the brake control valve.

A second aspect of the invention is the control device for an input clutch of a work vehicle according to the first aspect of the invention, wherein the valve operating member of the pressure reducing valve is coupled with the valve operating member of the brake control valve through a spring.

A third aspect of the invention is a control device for an input clutch of a work vehicle, which is applied to a work vehicle in that a driving force of an engine is transmitted to drive wheels through a traveling power train and also transmitted to a hydraulic pump for a work machine, comprising:

an input clutch which is disposed in a power transmission path of a traveling power train of the engine and between the engine and a transmission;

a brake means for decelerating the work vehicle;

a brake control valve which operates to increase the braking force of the brake means depending on a valve position;

a brake operation means which is disposed to operate the brake control valve;

a draining oil passage which is an oil passage branched from an oil passage for supplying a pressure oil to the input clutch and communicated with a tank; and a pressure reducing valve which is disposed in the draining oil passage and operates to increase the pressure oil flowing through the draining oil passage according to a valve position and to decrease a clutch pressure of the input clutch, wherein:

a valve operating member of the pressure reducing valve and a valve operating member of the brake control valve are mechanically coupled by a link mechanism, and a brake operating means is mechanically coupled with the link mechanism.

DETAILED DESCRIPTION OF THE INVENTION

Figure 1:
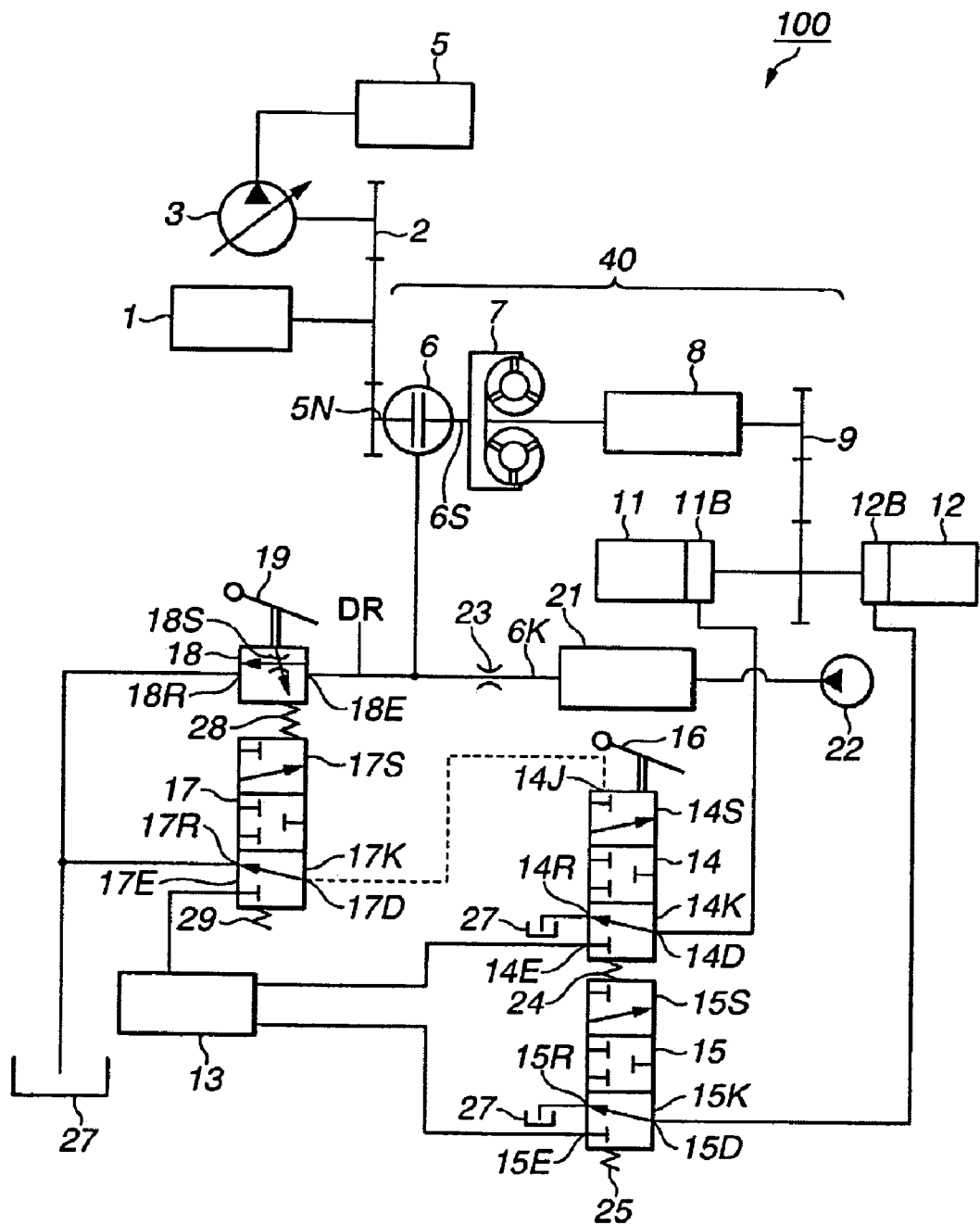
FIG. 1 is a block diagram of a control device for an input clutch of a work vehicle of an embodiment, showing the parts related to the present invention in the structure of the wheel loader.

According to the first and second aspects of the invention, as shown in FIG. 1, an input clutch 6 is disposed between an engine 1 and a transmission 8 on a power transmission path 40 of the engine 1 of a wheel loader 100. The vehicle is decelerated by brake means 11B, 12B. A brake control valve 17 operates to increase the braking force of the brake means 11B, 12B depending on the valve position. The brake operating means 19 is disposed to operate the brake control valve 17.

A draining oil passage DR is branched from an oil passage 6K for supplying the pressure oil to the input clutch 6, and the draining oil passage DR is communicated with a tank 27.

The draining oil passage DR is provided with a pressure reducing valve 18, and the pressure reducing valve 18 increases the pressure oil flowing through the draining oil passage DR depending on the valve position to decrease the clutch pressure of the input clutch 6.

The brake operating means 19 is mechanically coupled with a valve operating member (spool) of the pressure reducing valve 18, and the valve operating member of the pressure reducing valve 18 is mechanically coupled with the valve operating member (spool) of the brake control valve 17 by, for example, a spring 28.

Figure 3:
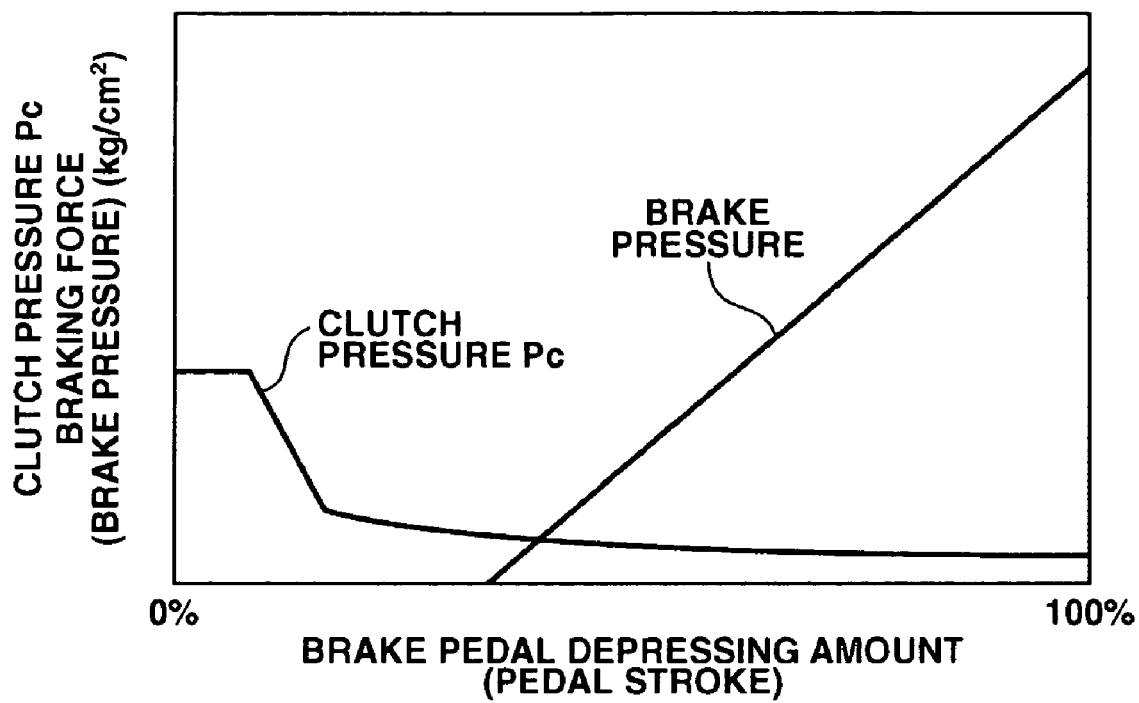
FIG. 3 is a diagram showing a relationship between a depressed amount (pedal stroke: 0 to 100%) of a brake pedal and a clutch pressure ($kg/cm^2$) of an input clutch and a braking force (brake pressure: $kg/cm^2$) generated by a brake device.

According to the present invention, the pressure reducing valve 18 is configured as a manual pressure reducing valve 18 which is manually operated by the brake operating means 19, and a relationship between the clutch pressure of the input clutch and the braking force (brake pressure) generated by the brake device shown in FIG. 3 can be determined easily by a simple structure in that the valve operating member of the pressure reducing valve 18 and the valve operating member of the brake control valve 17 are mutually coupled by a coupling member such as the spring 28.

Similarly, according to the third aspect of the invention, the valve operating member (spool) of the pressure reducing valve 18 and the valve operating member (spool) of the brake control valve 17 are mechanically coupled by a link mechanism 30, and the brake operating means 19 is mechanically coupled with the link mechanism 30.

According to the present invention, by a simple structure in that the valve operating member (spool) of the pressure reducing valve 18 and the valve operating member (spool) of the brake control valve 17 are mechanically coupled by the link mechanism 30, and the brake operating means 19 is mechanically coupled with the link mechanism 30, the relationship between the clutch pressure of the input clutch and the braking force (brake pressure) generated by the brake device shown in FIG. 3 can be set easily.

With further reference to the drawings, FIG. 1 is a block view of a control device for an input clutch of a work vehicle according to an embodiment, showing the portions related to the invention in the structure of a wheel loader.

As shown in FIG. 1, a driving force of the engine 1 of the wheel loader 100 is supplied to the traveling power train and a hydraulic pump 3 for a work machine through a PTO shaft 2 and distributed to traveling horsepower and working horsepower.

Specifically, the output shaft of the engine 1 of the wheel loader 100 is coupled with the PTO shaft 2. The PTO shaft 2 is coupled with the traveling power train and also with the hydraulic pump 3 for a work machine.

The power transmission path 40 of the engine 1 corresponding to the traveling power train is provided with the transmission 8 having a forward clutch, a reverse clutch, and individual speed stage clutches.

In the power transmission path 40 of the engine 1, the input clutch (modulation clutch) 6 is disposed between the engine 1 and the transmission 8. The input clutch 6 is, for example, a wet-type multi-plate hydraulic clutch.

Power of the engine 1 is transmitted to a front axle shaft 11 and a rear axle shaft 12 through the PTO shaft 2, an input shaft 6N of the input clutch 6, the input clutch 6, an output shaft 6S of the input clutch 6, a torque converter 7, the transmission 8, and a transfer 9.

And, power of the engine 1 is also supplied to a work machine through the PTO shaft 2, the pump 3 for the work machine, and a control valve 5 for the work machine.

By adjusting a clutch pressure of the pressure oil supplied to the input clutch 6, a frictional engagement force between the input shaft 6N and the output shaft 6S of the input clutch 6 is controlled. In a case where a clutch pressure Pc of the pressure oil supplied to the input clutch 6 is a holding pressure which is a maximum pressure, the input clutch 6 is perfectly connected (engaged). When the clutch pressure Pc of the pressure oil supplied to the input clutch 6 is decreased from the holding pressure, the input clutch 6 shifts from a completely connected (engaged) state to a connection released (disengaged) state.

The front axle shaft 11 and the rear axle shaft 12 each are provided with a front brake device 11B and a rear brake device 12B for braking the axle shafts 11, 12 to decelerate the vehicle. The brake devices 11B, 12B are hydraulic brake devices for operating or disengaging (operation release) the brake devices 11B, 12B according to the pressure (brake pressure) of the supplied operating oil.

A left brake pedal 19 is disposed at the front left-hand side of the driver's seat of the wheel loader 100 as a brake operating means which is depressed by the operator's left foot, and a right brake pedal 16 which is depressed by the operator's right foot is disposed at the front right-hand side of the driver's seat.

The front brake 11B is communicated with an outlet port 14D of a front brake control valve 14 through a brake pipe. An inlet port 14E of the front brake control valve 14 is communicated with a discharge port of the hydraulic pump 13. A drain port 14R of the front brake control valve 14 is communicated with a tank 27.

Similarly, the rear brake 12B is communicated with an outlet port 15D of a rear brake control valve 15 through a brake pipe. An inlet port 15E of the rear brake control valve 15 is communicated with the discharge port of the hydraulic pump 13. A drain port 15R of the rear brake control valve 15 is communicated with a tank 27.

A spool as a valve operating member for the front brake control valve 14 and a spool as a valve operating member for the rear brake control valve 15 are mechanically coupled through a spring 24. The spool as the valve operating member for the front brake control valve 14 is mechanically coupled with the right brake pedal 16. The spool of the rear brake control valve 15 is in contact with a return spring 25.

When the right brake pedal 16 is depressed, the front brake control valve 14 and the rear brake control valve 15 operate in synchronization.

Specifically, the front brake control valve 14 has a brake operation position 14S and a brake release position 14K. The pressure (brake pressure) of an operating oil supplied to the front brake device 11B is variable depending on a valve position of the front brake control valve 14.

The rear brake control valve 15 has a brake operation position 15S and a brake release position 15K. The pressure (brake pressure) of an operating oil supplied to the rear brake device 12B is variable depending on a valve position of the rear brake control valve 15.

In this embodiment, a brake system, which is configured such that braking force generated by the brake devices 11B, 12B becomes large as the brake pressure increases, is assumed.

When the right brake pedal 16 is depressed to shift the front brake control valve 14 toward the brake operation position 14S, the pressure oil discharged from the hydraulic pump 13 is supplied to the front brake device 11B through the inlet port 14E and outlet port 14D of the front brake control valve 14, and the front brake device 11B operates. When the right brake pedal 16 is depressed to shift the front brake control valve 14 to the brake operation position 14S, the rear brake control valve 15 is moved to the brake operation position 15S by the spring force of the spring 24, and the pressure oil discharged from the hydraulic pump 13 is supplied to the rear brake device 12B through the inlet port 15E and outlet port 15D of the rear brake control valve 15 to operate the rear brake device 12B.

When the right brake pedal 16 is released, the rear brake control valve 15 is moved to the brake release position 15K by the spring force of the return spring 25 and the spring force of the spring 24, and the front brake control valve 14 is moved to the brake release position 14K. Thus, the pressure oil in the front brake device 11B is discharged to the tank 27 through the outlet port 14D and the drain port 14R of the front brake control valve 14, and the operation of the front brake device 11B is disengaged (released). And, the pressure oil in the rear brake device 12B is discharged to the tank 27 through the outlet port 15D and drain port 15R of the rear brake control valve 15, and the operation of the rear brake device 12B is disengaged (released).

The brake control valve 17 is disposed in correspondence with the left brake pedal 19 and operates to increase the braking forces of the brake devices 11B, 12B according to the valve position.

The draining oil passage DR which is branched from the oil supply passage 6K for supplying the pressure oil to the input clutch 6 is disposed and communicated with the tank 27.

The draining oil passage DR is provided with the pressure reducing valve 18 which operates to increase the pressure oil, which flows through the draining oil passage DR, in accordance with the valve position to decrease the clutch pressure Pc of the input clutch 6.

The left brake pedal 19 is mechanically coupled with a spool as a valve operating member of the pressure reducing valve 18, and the spool as the valve operating member of the pressure reducing valve 18 is mechanically coupled with the spool as the valve operating member of the brake control valve 17.

In other words, a discharge oil passage of a hydraulic pump 22 is communicated with the inlet of an input clutch control valve 21.

The outlet of the input clutch control valve 21 is communicated with the oil supply passage 6K. The oil supply passage 6K is an oil passage for supplying the pressure oil to the input clutch 6 and communicated with the input clutch 6. The oil supply passage 6K is provided with a diaphragm 23 which has the downstream side set to the clutch pressure Pc of the input clutch 6.

The input clutch control valve 21 outputs the pressure oil of the original pressure corresponding to a control signal input from an unshown controller to the oil supply passage 6K.

The pressure reducing valve 18 has an adjustable diaphragm 18S. An inlet port 18E of the pressure reducing valve 18 is communicated with the downstream side of the diaphragm 23. An outlet port 18R of the pressure reducing valve 18 is communicated with the tank 27.

A pilot port 14J is disposed on the same pressure receiving side as the right brake pedal 16 of the front brake control valve 14. The pilot port 14J is communicated with an outlet port 17D of the brake control valve 17 through the pilot oil passage. An inlet port 17E of the brake control valve 17 is communicated with the discharge port of the hydraulic pump 13. The drain port 17R of the brake control valve 17 is communicated with the tank 27.

The spool of the brake control valve 17 is in contact with a return spring 29.

When the left brake pedal 19 is depressed, the pressure reducing valve 18 and the brake control valve 17 operate in synchronization.

In other words, the brake control valve 17 has a brake operation position 17S and a brake release position 17K. The pressure (brake pressure) of the operating oil supplied to the front brake device 11B and the rear brake device 12B varies depending on the valve position of the brake control valve 17.

When the left brake pedal 19 is depressed, an opening area of the adjustable diaphragm 18S of the pressure reducing valve 18 increases with the increase of the depressing amount. Therefore, the opening area of the adjustable diaphragm 18S of the pressure reducing valve 18 becomes larger as the depressing amount (pedal stroke) of the left brake pedal 19 increases, and the flow rate of the pressure oil discharged from the oil supply passage 6K to the tank 27 through the drain oil passage DR and the pressure reducing valve 18 increases. If the oil amount discharged to the tank 27 becomes large, the clutch pressure Pc of the input clutch 6 lowers. When the clutch pressure Pc of the input clutch 6 becomes small, the input clutch 6 slips, the driving force transmitted from the engine 1 to the transmission 8 via the input clutch 6 lowers, and the speed of the wheel loader 100 decreases.

When the left brake pedal 19 is depressed to move the adjustable diaphragm 18S of the pressure reducing valve 18 toward the increasing side, the brake control valve 17 is moved toward the brake operation position 17S by the spring force of the spring 28, the pressure oil discharged from the hydraulic pump 13 is supplied to the pilot port 14J of the front brake control valve 14 through the inlet port 17E and the outlet port 17D of the brake control valve 17, and the pilot pressure acts on the front brake control valve 14. Thus, the front brake control valve 14 is moved toward the brake operation position 14S. As a result, the rear brake control valve 15 is moved toward the brake operation position 15S in association with the front brake control valve 14 in the same manner as described above, and the front brake device 11B and the rear brake device 12B operate.

When the left brake pedal 19 is released, the brake control valve 17 is moved to the brake release position 17K by the spring force of the return spring 29 and the spring force of the spring 28, and the pressure reducing valve 18 is moved to the side to decrease the opening area of the adjustable diaphragm 18S. Thus, the clutch pressure Pc of the input clutch 6 is increased. And, the pilot port 14J of the front brake control valve 14 is communicated with the tank 27 through the outlet port 17D and the drain port 17R of the brake control valve 17, so that the pilot pressure acting on the pilot port 14J of the brake control valve 14 has the same low pressure as the tank pressure. Therefore, the front brake control valve 14 and the rear brake left control valve 15 are moved in association with each other toward the brake release positions 14K, 15K in the same manner as described above, and the operations of the front brake device 11B and the rear brake device 12B are disengaged (released).

As described above, the clutch pressure Pc of the input clutch 6 becomes small as the depressed amount of the left brake pedal 19 increases, and the braking force generated by the front brake device 11B and the rear brake device 12B increase.

FIG. 3 shows a relationship between the depressed amount (pedal stroke: 0 to 100%) of the left brake pedal 19 and the clutch pressure Pc (kg/cm$^2$) of the input clutch 6 and the braking forces (brake pressure: kg/cm$^2$) generated by the front brake device 11B and the rear brake device 12B. The characteristics shown in FIG. 3 are indicated as an example, and the invention is not limited to these characteristics.

The characteristics shown in FIG. 3 can be obtained by appropriately setting parameters such as a spring constant, a free length of the spring 28.

As described above, according to this embodiment, the relationship between the clutch pressure of the input clutch 6 and the braking forces (brake pressures) generated by the front and rear brake devices 11B, 12B shown in FIG. 3 can be set easily by a simple structure in that the pressure reducing valve 18 is configured as a manual pressure reducing valve 18 which is manually operated by means of the left brake pedal 19, and the spool of the pressure reducing valve 18 and the spool of the brake control valve 17 are mutually coupled by means of the spring 28.

Figure 2:
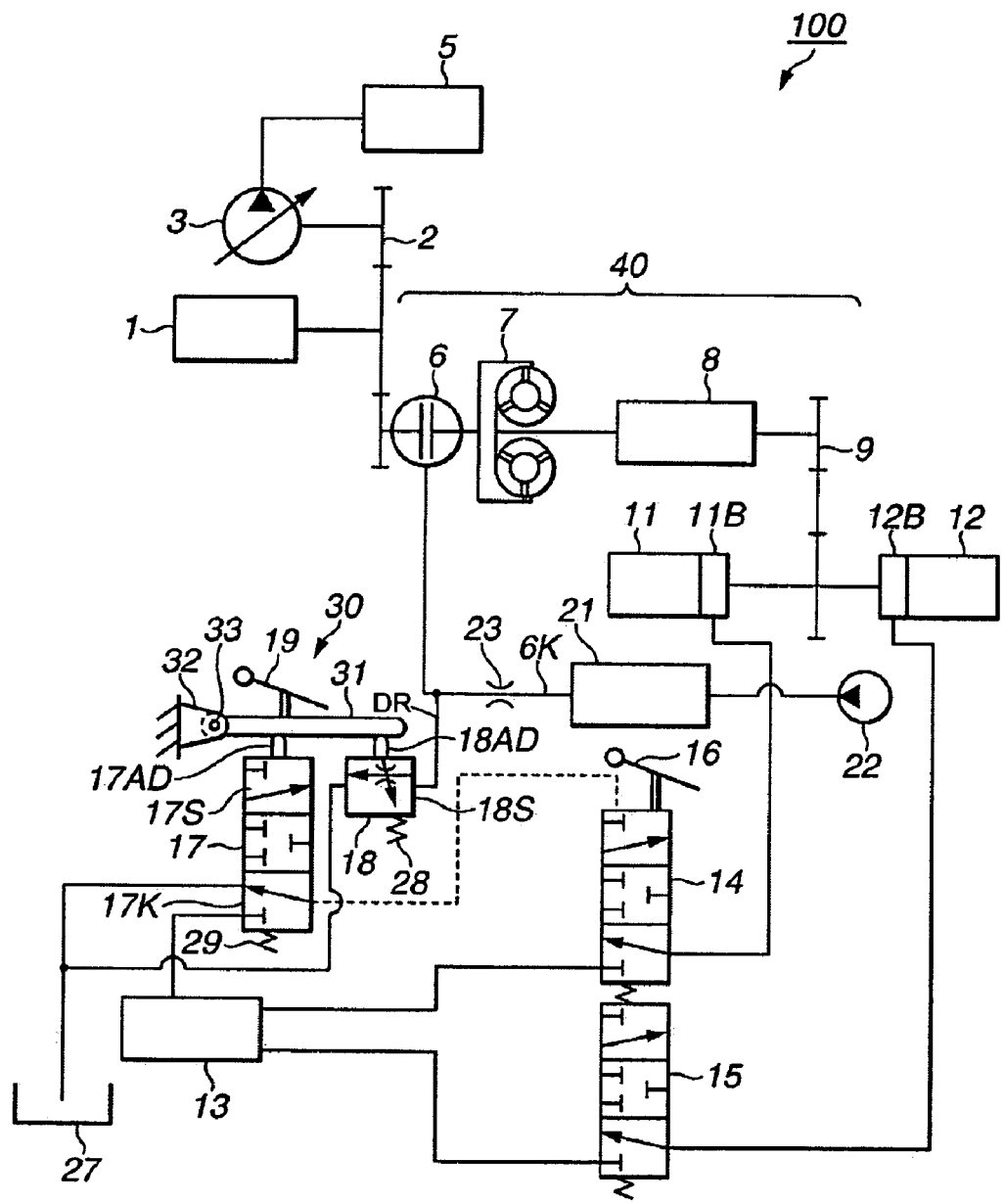
FIG. 2 is a drawing showing another embodiment which is a modified embodiment of FIG. 1.

FIG. 2 shows a modified embodiment of FIG. 1. Like component elements as those of FIG. 1 are denoted by like reference numerals, and descriptions thereof will be omitted appropriately. And, the different parts only will be described.

In the embodiment of FIG. 2, the valve operating member (spool) of the pressure reducing valve 18 and the valve operating member (spool) of the brake control valve 17 are mechanically coupled by a link mechanism 30, and the left brake pedal 19 is mechanically coupled with the link mechanism 30.

The link mechanism 30 is comprised of a link 31, a bracket 32 and a pin 33. The bracket 32 is fixed to the vehicle body, and the base end portion of the link 31 is pivotably coupled with the bracket 32 through the pin 32.

A rod 18AD is connected to the spool as a valve operating member of the pressure reducing valve 18. A rod 17AD is connected to the spool as a valve operating member of the brake control valve 17. The rod 18AD and the rod 17AD are separated from each other by a prescribed distance and in contact with the link 31 in its longitudinal direction. The rods 18AD, 17AD and the left brake pedal 19 are disposed to oppose with the link 31 between them. A return spring 28 is contacted to the spool of the pressure reducing valve 18, and a return spring 29 is contacted to the spool of the brake control valve 17.

When the left brake pedal 19 is depressed, the link 31 pivots according to the depressed amount, the rod 18AD of the pressure reducing valve 18 is pushed in accordance with the pivoting of the link 31 in a direction to increase the opening area of the adjustable diaphragm 18S, and the rod 17AD of the brake control valve 17 is pushed toward the brake operation position 17S. Therefore, the pressure reducing valve 18 is moved to the side to increase the adjustable diaphragm 18S, and the brake control valve 17 is moved toward the brake operation position 17S. Thus, in the same manner as described above, the clutch pressure Pc of the input clutch 6 decreases according to the depressed amount of the left brake pedal 19, and the front brake device 11B and the rear brake device 12B operate to cause braking.

When the left brake pedal 19 is released, the rod 18AD of the pressure reducing valve 18 is pushed by the spring force of the return spring 28 in a direction to decrease the opening area of the adjustable diaphragm 18S, and the rod 17AD of the brake control valve 17 is pushed by the spring force of the return spring 29 in a direction toward the brake release position 17K. Therefore, the pressure reducing valve 18 is moved to the side to decrease the adjustable diaphragm 18S, and the brake control valve 17 is moved to the brake release position 17K. Therefore, the clutch pressure Pc of the input clutch 6 increases depending on the released amount of the left brake pedal 19 in the same manner as described above, and the operations of the front brake device 11B and the rear brake device 12B are disengaged (released).

The characteristics shown in FIG. 3 can be obtained by appropriately setting parameters such as positions where the link 31 of the link mechanism 30 is contacted to the rods 18AD, 17AD.

According to the embodiment described above, the relationship between the clutch pressure Pc of the input clutch 6 and the braking forces (brake pressures) generated by the front and rear brake devices 11B, 12B shown in FIG. 3 can be set easily by a simple structure in that the spool (rod 18AD) of the pressure reducing valve 18 and the spool (rod 17AD) of the brake control valve 17 are mechanically coupled by the link mechanism 30, and the left brake pedal 19 is mechanically coupled with the link mechanism 30.

In the structure example of FIG. 1, the pressure reducing valve 18 and the brake control valve 17 are coupled by means of the spring 28, but it is also possible to couple them to another coupling member such as a cable, a rod or the like instead of the spring 28.

It was assumed in the above-described embodiment that the brake pedals 16, 17 were used to perform the depressing operation, but the pedals may be replaced by operation means such as levers for manual operation.

And, it was also assumed in the above-described embodiment that the work vehicle was a wheel loader, but the present invention can be applied to another work vehicle in the same manner if it is a work vehicle provided with an input clutch (modulation clutch).

The invention claimed is:

1. A control device for an input clutch of a work vehicle, which is applied to a work vehicle in which a driving force of an engine is transmitted to drive wheels through a traveling power train and also transmitted to a hydraulic pump for a work machine, comprising:
   an input clutch which is disposed between the engine and a transmission on a power transmission path of the traveling power train of the engine;
   a brake means for decelerating the work vehicle;
   a brake control valve which operates to increase a braking force of the brake means depending on a valve position;
   a brake operation means which is disposed to operate the brake control valve;
   a draining oil passage which is an oil passage branched from an oil passage for supplying a pressure oil to the input clutch and communicated with a tank; and
   a pressure reducing valve which is disposed in the draining oil passage and operates to increase the pressure oil flowing through the draining oil passage according to a valve position and to decrease a clutch pressure of the input clutch, wherein:
   the brake operation means is mechanically coupled with the pressure reducing valve, and the pressure reducing valve is mechanically coupled with the brake control valve through a spring, one end of the spring being connected to the pressure reducing valve, and the other end of the spring being connected to the brake control valve.

2. A control device for an input clutch of a work vehicle, which is applied to a work vehicle in which a driving force of an engine is transmitted to drive wheels through a traveling power train and also transmitted to a hydraulic pump for a work machine, comprising:
   an input clutch which is disposed between the engine and a transmission on a power transmission path of a traveling power train of the engine;
   a brake means for decelerating the work vehicle;
   a brake control valve which operates to increase a braking force of the brake means depending on a valve position, the brake control valve having a rod;
   a brake operation means which is disposed to operate the brake control valve;
   a draining oil passage which is an oil passage branched from an oil passage for supplying a pressure oil to the input clutch and communicated with a tank;
   a pressure reducing valve which is disposed in the draining oil passage and operates to increase the pressure oil flowing through the draining oil passage according to a valve position and to decrease a clutch pressure of the input clutch, the pressure reducing valve having a rod; and
   a link mechanism having a link, wherein:
   the rod of the pressure reducing valve and the rod of the brake control valve are in contact with the link of the link mechanism, and the brake operation means is mechanically coupled with the link mechanism.

* * * * *